US010895556B2

(12) United States Patent
Sutherland

(10) Patent No.: US 10,895,556 B2
(45) Date of Patent: Jan. 19, 2021

(54) PREDICTIVE INTEGRITY ANALYSIS

(71) Applicant: General Electric Company, Schenectady, NY (US)

(72) Inventor: Jeffrey Earle Sutherland, Calgary (CA)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 372 days.

(21) Appl. No.: 15/870,304

(22) Filed: Jan. 12, 2018

(65) Prior Publication Data

US 2018/0275100 A1 Sep. 27, 2018

Related U.S. Application Data

(60) Provisional application No. 62/474,460, filed on Mar. 21, 2017.

(51) Int. Cl.
| | |
|---|---|
| *G01N 29/04* | (2006.01) |
| *G06F 113/14* | (2020.01) |
| *G01N 29/44* | (2006.01) |
| *G05D 7/06* | (2006.01) |
| *E21B 47/10* | (2012.01) |
| *G01N 17/04* | (2006.01) |
| *G06N 7/00* | (2006.01) |
| *G01N 27/82* | (2006.01) |
| *G06Q 10/00* | (2012.01) |

(52) U.S. Cl.
CPC ............ *G01N 29/04* (2013.01); *E21B 47/10* (2013.01); *G01N 29/043* (2013.01); *G01N 29/4418* (2013.01); *G01N 29/4445* (2013.01); *G01N 29/4472* (2013.01); *G05D 7/0676* (2013.01); *G01N 17/04* (2013.01); *G01N 27/82* (2013.01); *G01N 2291/0258* (2013.01); *G01N 2291/2634* (2013.01); *G06F 2113/14* (2020.01); *G06N 7/005* (2013.01); *G06Q 10/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,664,357 | A * | 5/1972 | Kreiss ................. | G01M 3/2807 137/2 |
| 6,243,483 | B1 * | 6/2001 | Petrou ...................... | F17D 5/00 348/144 |
| 7,043,373 | B2 * | 5/2006 | Pittalwala ................ | F17D 5/00 702/34 |

(Continued)

*Primary Examiner* — Jennifer E Simmons
(74) *Attorney, Agent, or Firm* — Mintz Levin Cohn Ferris Glovsky and Popeo, PC; Lisa Adams

(57) ABSTRACT

A system includes one or more tools, sensors, or both configured to obtain data related to the one or more pipelines, wherein the data is ultrasonic data, electromagnetic data, or both, and a cloud-based computing system including at least one processor that receives the data from the one or more tools, sensors, or both, performs analysis to generate a virtual structural model of the one or more pipelines based on the data, determines one or more states of the one or more pipelines using the virtual structural model and determines whether to take one or more actions when the one or more states indicate that the one or more pipelines violate a threshold operation boundary.

20 Claims, 4 Drawing Sheets

(56) References Cited

U.S. PATENT DOCUMENTS

| | | | | |
|---|---|---|---|---|
| 2002/0143469 A1* | 10/2002 | Alexander | .............. | A62B 99/00 |
| | | | | 702/2 |
| 2005/0038825 A1* | 2/2005 | Tarabzouni | ............. | G06F 16/29 |
| 2012/0279599 A1* | 11/2012 | Gluskin | ................. | G01N 17/02 |
| | | | | 138/97 |
| 2014/0100832 A1* | 4/2014 | Pado | ....................... | G06F 30/20 |
| | | | | 703/6 |
| 2015/0330551 A1* | 11/2015 | Van Nie | ............... | G01N 29/225 |
| | | | | 138/98 |
| 2017/0076563 A1* | 3/2017 | Guerriero | ............. | G06F 16/245 |
| 2017/0152729 A1* | 6/2017 | Gleitman | ................ | E21B 44/00 |

* cited by examiner

PREDICTIVE INTEGRITY ANALYSIS

CROSS REFERENCE TO RELATED APPLICATIONS

This application is a Non-Provisional Application claiming priority to U.S. Provisional Patent Application No. 62/474,460, entitled "Predictive Integrity Analysis", filed Mar. 21, 2017, which is herein incorporated by reference.

BACKGROUND

The subject matter disclosed herein relates to integrity analysis, and more particularly, to a predictive integrity virtual analysis of structural and operational conditions of one or more pipelines.

After certain components, such as pipelines, are installed and commissioned, it may be difficult to ascertain the condition of the components over time as fit for operational service and the like. As such, improved systems and methods for monitoring the integrity of these components over time may be desirable.

BRIEF DESCRIPTION

Certain embodiments commensurate in scope with the original claims are summarized below. These embodiments are not intended to limit the scope of the claims, but rather these embodiments are intended only to provide a brief summary of possible forms of the disclosed embodiments. Indeed, the claims may encompass a variety of forms that may be similar to or different from the embodiments set forth below.

In one embodiment, a system includes one or more tools, sensors, or both configured to obtain data related to one or more pipelines, wherein the data comprises ultrasonic data, electromagnetic data, or both, and a cloud-based computing system comprising at least one processor to receive the data from the one or more tools, sensors, or both, perform an analysis to generate a virtual structural model of the one or more pipelines based on the data, determine one or more states of the one or more pipelines using the virtual structural model, and determine whether to take one or more actions when the one or more states indicate that the one or more pipelines violate a threshold operation boundary.

In an embodiment, a device includes an input configured to receive measured data indicative of a physical characteristic or an operational characteristic of a pipeline, and a processor coupled to the input and configured to receive the data from the input, perform an analysis to generate a virtual structural model of the pipeline based on the data, determine one or more states of the of the pipeline using the virtual structural model, and determine whether to take one or more actions when the one or more states indicate that the pipeline violates a threshold operation boundary.

In an embodiment a non-transitory tangible computer-readable medium includes computer executable instructions configured to receive measured data indicative of a physical characteristic or an operational characteristic of a pipeline, perform an analysis to generate a virtual structural model of the pipeline based on the data, determine one or more states of the of the pipeline using the virtual structural model, and determine whether to take one or more actions when the one or more states indicate that the pipeline violates a threshold operation boundary.

BRIEF DESCRIPTION OF THE DRAWINGS

These and other features, aspects, and advantages of the disclosed embodiments will become better understood when the following detailed description is read with reference to the accompanying drawings in which like characters represent like parts throughout the drawings, wherein.

DETAILED DESCRIPTION

Figure 1:
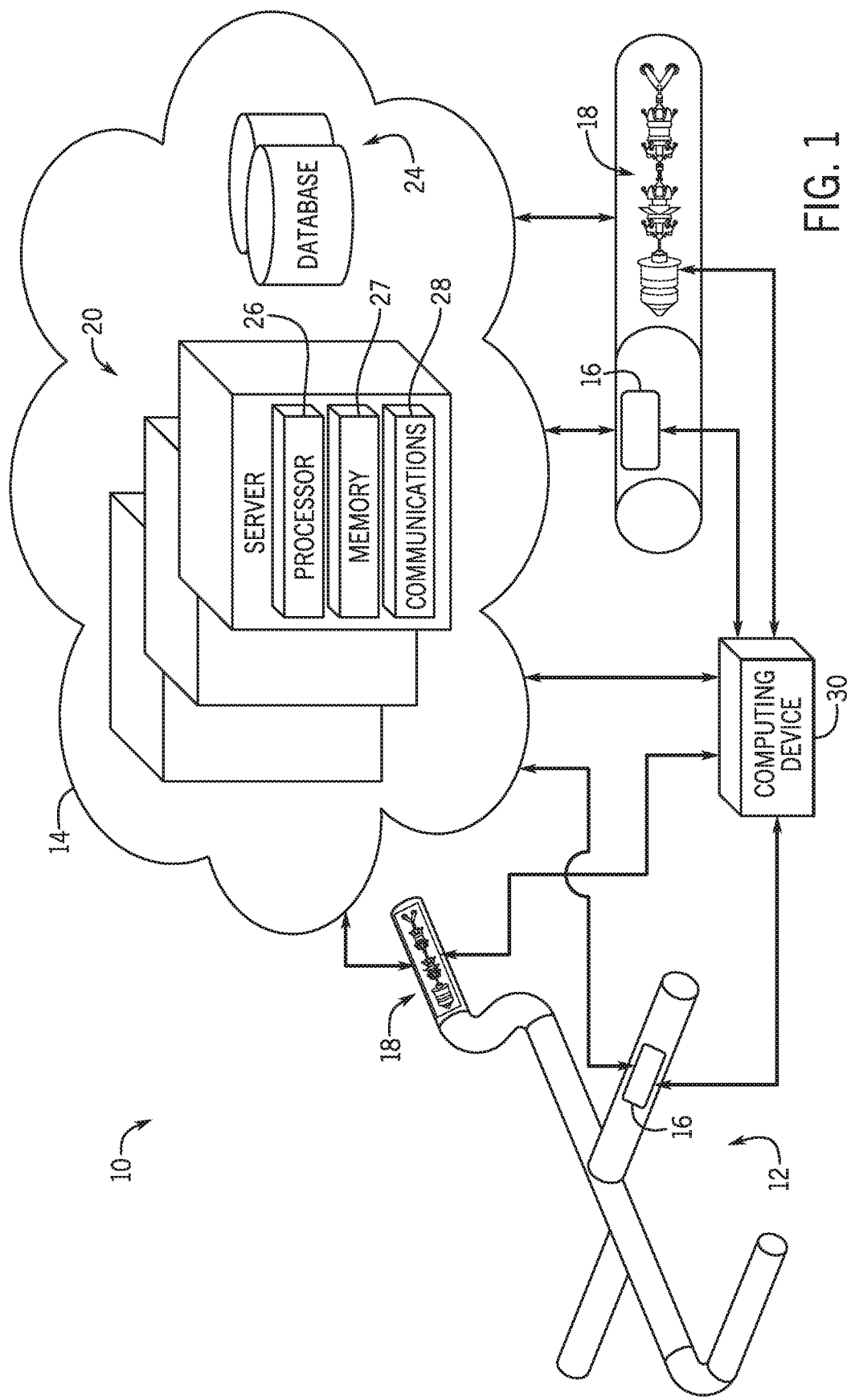
FIG. 1 an illustration of a system for performing predictive integrity analysis, in accordance with an embodiment of the present disclosure.

One or more specific embodiments will be described below.

Pipeline integrity can relate to the safety and/or operations of the pipeline through monitoring, assessment, and/or prevention of any issues that may affect the structural fit for service of a pipeline to transport its products (e.g., hydrocarbons, natural gas, oil, etc.) at desired operational levels (e.g. mass-flow, pressures). Various inline inspection (ILI) tools and sensors may obtain data related to structural and physical characteristics of certain components, such as pipelines. For example, sensors may acquire corrosion data that indicates whether a wall of a pipeline has thinned, and other sensors may acquire cracking data that indicates whether the wall has split apart. Other sensor types may capture geometric information such as the cross-sectional shapes and/or centerline direction of the pipe. In addition, other sensor types may capture information related to the material properties of the pipe material. Still other sensors types may capture environmental properties of the pipeline operation as measured around the tool, such as local pressure, temperature, product density, and/or composition at any given point in the pipeline. The available datasets may also include the location and localized geographic information with reference to the pipelines as known for the pipeline from the inline inspection tools or above-ground geographic surveys. The available datasets may be examined to identify correlations between the datasets; however, this process may prove to be complex and time consuming.

Embodiments of the present disclosure generally relate to systems and methods for access and assessment of pipeline integrity and reliability using a virtual model generated in a distributed cloud-computing environment (e.g., a cloud-based computing system) from the available data sources. In embodiments, the systems and methods described herein may provide rapid and/or detailed access and assessment. It should be noted that one or more of one pipeline, many pipelines, a network of pipelines may be modeled. For example, a virtual set of pipeline networks (e.g., series of networks of pipelines) may be simulated and visualized using the disclosed techniques. Continuous and segmented data sets regarding the state of the pipelines, such as inline inspection (ILI), may be loaded, correlated, and used to record historical state information regarding a structural frame of the pipelines and/or current state information regarding the state of the structural frame. The virtual model of such state of the structural frame can be assessed against known engineering codes and practices, as well as advanced computational analysis techniques like FEA and structural design methods. This information may also be processed with change/growth methods to determine a variety of predicted future state(s) at different future time periods, to determine reliability characteristics of the structural frame at those time periods and to determine optimal preventative maintenance methods and timing as well as pipeline downtime for such activities (e.g., replacement of pipe, patchwork, decrease load conditions). As a result, the future reliability and predictive maintenance operations can be modeled and available for use in timely manner.

In some embodiments, the cloud-based computing system may correlate, manage, and/or compute structural information that is received from multiple ILI and other inspection/structural descriptive data sets obtained via ILI tools and/or sensors to form a virtual structure. The processing may be handled and managed in the cloud-based computing system by using a parallel high performance computing framework with a number of computing systems working together. High performance computing power can enable rapid computation of statistics, probabilistic reliability assessments, and quasi-real time structural evaluation at a detailed elemental level (e.g., anomalies may be identified and evaluated via preset industry assessment codes and/or via finite element analysis (FEA)/multi-physics engine or similar computational methods for structural assessment). Using a cloud-based computing system can also enable remote access functionality for select users internally to the given organization, and/or for select external stakeholders as well regarding such predictive analyses.

Using the disclosed embodiments may enable data traceability for engineering decisions related to the data, predicting integrity of current state/reliability and future state reliability for one or more pipelines, and/or data organization and management in a cloud-based computing system. Further, shared resources and parallel computing enabled by the cloud-based computing system may enable rapid computations and reduced complexity and errors in time-lag/manual data handling transition within computation of integrity and engineering assessments. To that end, the disclosed embodiments may remove or reduce manual handling of data, correlation, and/or assessment. In some embodiments, the cloud-based computing system may use existing industry engineering codes and/or computational methods such as finite element analysis (FEA) to establish structural integrity predictions in a thorough (e.g., full pipeline) and timely manner.

In addition, "combined" or "multiple" threat cases may be considered by the nature of the virtual model structure within the cloud-based computing system. For example, the virtual model may illustrate that a bending strain area of a pipeline overlaps with a corrosion area, which forms a different structural situation than each of the individual threats alone. Corrosion and crack anomalies may be found and assessed in the same localized region, dented/deformed regions of the pipe also having corrosion or cracks in the pipe wall may be modeled for fatigue via FEA, and the like. Such modeling can include operational parameters such as product pressure, temperature as taken from the sensor data sources or as assumed values for the given location. Future state predictions may be achieved with the use of a baseline current state and change/growth models to each point of the virtual pipeline of each degrading mechanisms (e.g., crack growth, corrosion growth, dent fatigue, geotechnical movement).

With the foregoing in mind, FIG. 1 is an illustration of a system 10 for performing predictive integrity analysis, in accordance with an embodiment of the present disclosure. The system 10 includes one or more pipelines 12. As mentioned above, the pipelines 12 may include a single pipeline, a network of pipelines, or a series of networks of pipelines. The pipelines 12 may transport product (e.g., hydrocarbons, oil, natural gas, etc.) and may be disposed below and/or above ground. Determining the mechanical state of the pipelines 12 efficiently and in quasi-real time may enable the reduction of lost operational time of the pipeline(s) as well as optimization of the identification of the timing, type, and instructions related to repairs, among other things. Thus, some embodiments can use a cloud-based computing system 14 that can use a virtual model of the pipelines 12 to enable the assessment of historic, current, and/or future structural and operational states of the pipelines. The cloud-based computing system 14 may determine whether to take one or more actions based upon the assessment (e.g., perform maintenance, replace a part, schedule maintenance, etc.). For example, the cloud-based computing system 14 may alter (e.g., reduce) operating parameters of the system 10 so as to reduce stress on an assessed portion of the pipeline(s) 12 so as to extend an amount of time the system 10 can operate before maintenance and/or part replacement occurs. In this manner, the cloud-based computing system 14 may operate to reduce lost operational time of the pipeline(s) 12 during periods of high demand and instead adjust maintenance and/or part replacement time periods to periods of lowered activity in the system 10. Likewise, for example, the cloud-based computing system 14 may alter (e.g., increase or decrease) operating parameters of the system 10 so as to increase or reduce stress on an assessed portion of the pipeline(s) 12 so as to cause portions of the system 14 to have scheduled maintenance and/or part replacement at similar times (e.g., to match maintenance and/or part replacement schedules for the pipeline(s) 12 so that the frequency of maintenance and/or part replacement of the pipeline(s) 12 is reduced). A user or operator may thereafter carry out the one or more actions, such as by performing maintenance, replacing a part, scheduling/performing maintenance, etc.

To enable modeling the virtual pipelines, data from numerous sensors 16 and/or inline inspection (ILI) tools 18 may be used throughout the pipelines 12 to obtain data related to the pipelines 12. The sensors 16 and/or ILI tools 18 may obtain magnetic, ultrasonic, radiographic and/or electromagnetic data regarding its surrounding environment, the condition of the pipelines 12, and the like. The sensors 16 and/or ILI tools 18 may transmit that data to the cloud-based computing system 14. The signal data from ILI tools 18 and sensors 16 may be analyzed and processed on a computing device 30, or in the cloud-based computing system 14 on server 20 using processor 26, memory 27, or both via communication component 28. Some signal ILI navigational data may be processed to generate a continuous pipeline centerline in global positioning system (GPS) coordinates to enable the cloud-based computing system 14 to map the measurements with various locations in the pipelines 12. In some instances, the ILI tools 18 may traverse the pipelines 12 to obtain images of the pipelines 12. The ILI tools 18 may include an inertial or positioning sensor probe that may or may not be attached to a wire. The data obtained by the ILI tools 18 and/or the sensors 16 may provide indications of one or more of volumetric wall loss by location, orientation of the pipeline 12 (e.g., length, width, height), cracking, pressure, flow, geometry of the pipeline (e.g., to determine whether external force has hit the pipeline 12), a centerline, weld anomalies, bending strains, transition/fittings/facility, other strain loading, material properties, and the like.

The data obtained via the ILI tools 18 and sensors 16 may be received by one or more servers 20 of the cloud-based computing system 14 and stored in one or more memories 22 of the servers 20 or in one or more databases 24 included in the cloud-based computing system 14 that are external to the servers 20. The servers 20 may be communicatively coupled to each other and may distribute various tasks between each other to perform the tasks more efficiently. The servers 20 may also include one or more processors 26 and a communication component 28. The communication component 28 may be a wireless or wired communication component that may facilitate communication between the cloud-based computing system 14, the ILI tools 18, the sensors 16, and/or a computing device 30.

The processor 26 may be any type of computer processor or microprocessor capable of executing computer-executable code. The processor 26 may also include multiple processors that may perform the operations described below. The memory 22 may be any suitable article(s) of manufacture that can serve as non-transitory media to store processor-executable code, data, analysis of the data, or the like. These articles of manufacture may represent computer-readable media (e.g., any suitable form of memory or storage) that may store the processor-executable code used by the processor 26 to perform the presently disclosed techniques. Generally, the processor 26 may execute computer instructions that virtually model pipelines 12 based on a multitude of data received from the ILI tools 18 and/or the sensors 16 using various techniques (e.g., finite element analysis). In some embodiments, due to the distributed nature of the servers 20 in the cloud-based computing system 14, the shared resources of the servers 20 can enable parallel processing of the modeling to enable quasi-real time feedback. For example, each server 20 may be responsible for processing a different portion of the model at substantially the same time and a single server 20, that combines the results of the model and outputs the results to the computing device 30, may collect the results. In this way, no one server 20 is inundated with the computationally expensive task of virtually modeling the entire pipeline 12 system and the processing time may be reduced.

The servers 20 may receive data from one or more of the ILI tools 18 and/or sensors 16 and generate a virtual pipeline by using various modeling techniques (e.g., mathematic, physics-based). The servers 20 may transform the received data into a different format that can be used to create virtual pipeline. Using the modeled virtual pipelines 12, the servers 20 may evaluate the pipeline state (e.g., past, current, future) by using finite element analysis. The servers 20 may predict future timeframes of when certain conditions may occur and subsequently when additional actions may be taken, such as repair, pipeline depressurization, or shutdown. In some instances, the servers 20 may correlate numerous identified issues, such as corrosion, cracks, complex features, geometry, weld anomalies, bending strain, stress, material properties, and the like within a full structural analyses, as opposed to analyzing each issue individually in a simpler but potentially limited engineering calculation. Using the current data, the servers 20 may extrapolate future growth or future states of when the pipelines 12 may stop operating within a desired range. The desired ranges may be predetermined ranges for any pipeline 12 and the desired ranges may relate to product throughput (flow), pressure, and the like. The servers 20 may perform the computations of various processes described below in near real time either on demand from users and/or automatically based on certain data change triggers, as received from data updates via sensors 16, ILI tools 18, and/or data sets on record in database 24 and/or memory 27. Interested stakeholders and users may access the results via computing device 30.

The databases 24 may be related to various aspects of the pipelines 12. For example, the databases 24 may include information regarding various regulations related to how the pipelines 12 should be maintained. Additionally, the regulations may be related to how maintenance operations should be documented by the user of the computing device 30. The databases 24 may also include data related to warranty information for the pipelines 12, service contact information related to the pipelines 12, and other information that may be useful to an operator of the pipelines 12. Further, the databases 24 and/or the memory 22 may store historical sensor and/or ILI data, as well as historical state data related to the pipelines 12 determined by the processors 26.

The computing device 30 may store an application that provides a graphical user interface (GUI) that displays the visualization of the modeled pipelines 12, as well as any predictions and/or actions (e.g., maintenance, repair, replacement, etc.) to be taken. That is, the application may not perform any computationally intensive processing. Instead, in some embodiments, the application may function as a front-end display of data and results of the integrity predicting modeling performed by the cloud-based computing system 14. For example, in a client-server architecture, a website may be accessed via a browser on the computing device 30 and the website may function as a thin-client in that it just displays information provided by the cloud-based computing system 14 without actually performing any modeling.

Although the components described above have been discussed with regard to the servers 20 of the cloud-based computing system 14, it should be noted that similar components may make up the computing device 30. Further, it should be noted that the listed components are provided as example components and the embodiments described herein are not to be limited to the components described with reference to FIG. 1.

Figure 2:
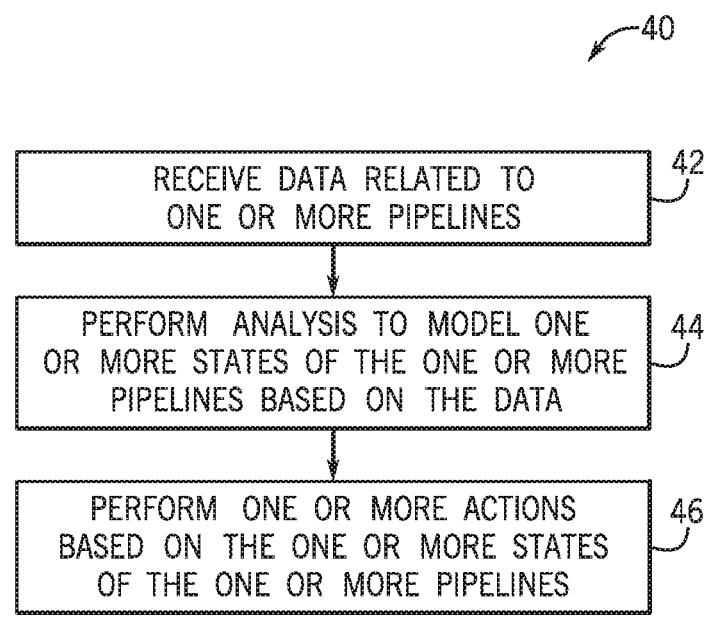
FIG. 2 is a flow diagram of a process suitable for performing predictive integrity analysis, in accordance with an embodiment of the present disclosure.

FIG. 2 is a flow diagram of a process 40 suitable for performing predictive integrity virtual analysis, in accordance with an embodiment of the present disclosure. Although the following description of the process 40 is described with reference to the processor 26 of one or more servers 20 of the cloud-based computing system 14, it should be noted that the process 40 may be performed by one or more other processors disposed on other devices that may be capable of communicating with the cloud-based computing system 14, such as the computing device 30, or other components associated with the system 10. Additionally, although the following process 40 describes a number of operations that may be performed, it should be noted that the process 40 may be performed in a variety of suitable orders and all of the operations may not be performed. It should be appreciated that the process 40 may be distributed between the servers 20 of the cloud-based computing system 14, distributed between local devices and the servers 20, individually, or any combination of the devices.

Referring now to the process 40, the processor 26 may receive (block 42) data related to the one or more pipelines 12 from the ILI tools 18 and/or the sensors 16. In some instances, the amount of data may be large due to the frequency of measurements and the sheer size of the pipeline networks being measured. The data may relate to material properties obtained from inspection data or other physical operational data available for a region of interest. The data may include ultrasonic and/or electromagnetic measurements, among other things. In some embodiments, the data may be stored in the one or more databases 24 in the cloud-based computing system 14. Additionally or alternatively, the data may be stored in the memories 22 of each or in some of the servers 20 in the cloud-based computing system 14. In this way, the cloud-based computing system 14 enables storing the ILI data and/or sensor data in a single location. Further, historical data may be maintained in the databases 24 and/or the memories 22.

In some embodiments, the data may be indicative of certain issues, such as corrosion (e.g., metal loss resulting in wall thinning), cracking (e.g., pipeline split open due too much pressure), pipeline geometry (e.g., abnormal radius), stress loading (e.g., earthquake, flood, excavation, construction in area), pressure within pipelines 12, flow, weld anomalies, material properties, and the like. In some embodiments, the data may be formatted to enable finite element analysis. For example, the data may be formatted using a convention related to a "box listing" or "location listing." The box listing or location listing may include a physical location (e.g., geographic, such as a distance from a reference number) of the box in the pipelines 12, an identifier, and/or certain details of the box (e.g., orientation (length, width, height)), that define the physical feature attributes represented by that box. The box listing or location listing may be represented concurrently in a spreadsheet and the listings may enable an operator to find the box on the pipeline 12 to repair it, replace it, or the like as a parallel data set to the results of the more detailed FEA analyses. That is, the box listing or location may enable virtually representing the pipeline 12 in elemental structure using a computer-aided design (CAD) image that represents defects or loading conditions on the pipeline 12 to enable advanced assessments, as described below.

The processor 26 may also perform (block 44) analysis to model one or more physical states of the one or more pipelines 12 based on the data. In particular, in some embodiments, the processor 26 may use the data formatted as described above to perform finite element analysis or similar computational structural analyses. For example, the processor 26 may correlate the element level data (e.g., generated from corrosion by location, cracking by location, stress loading by location, etc.) as represented from data sources of inline inspection 18, sensors 16, to map properties of the pipelines 12 for each elemental location to generate a virtual model of the entire pipeline. In some embodiments, the processor 26 may use modeling (e.g., set of mathematical equations, physics-based) to generate the virtual structural model of the pipelines 12. The virtual structural model may include a visualization of the physical pipelines 12. The finite element analysis may be performed at the element level to enable a more detailed assessment of correlated issues (e.g., corrosion, cracking, stress loading, flow, pressure, etc.).

The processor 26 may use the virtual structural model to determine historic states of the pipelines 12, current states of the pipelines 12, and/or predicted future states (e.g., with the use of change/growth methods). For example, performing finite element analysis on the formatted data may enable predicting how the pipelines 12 react to real-world forces, corrosion, cracking, pressure, vibration, heat, fluid flow, and other physical effects. In addition, the finite element analysis may be subdivided in smaller computations (e.g., algebraic equations, partial differential equations, etc.) between servers 20 so portions of the pipelines 12 may be modeled separately. Breaking the problem domain into smaller portions may enable faster compute time and more accurate representation of complex geometry and physical state of the pipelines 12.

Further, in some embodiments, the various current states may be stored as historic states in the databases 24 and/or the memories 22. The processor 26 may generate overlapping representations of the historic states of the pipelines 12 with the current states of the pipelines 12 to enable visualizing the change in the structural composition of the pipelines 12 over time. In some embodiments, the historical state data may be maintained for extended periods of time, such as decades.

The processor 26 may determine the pipeline state and any future states to determine or predict when the pipelines 12 or portions of the pipelines 12 stop operating within a desired threshold boundary or range (e.g., detected level of corrosion). For example, if the ILI data or sensor data indicates that a threshold boundary is violated, then the processor 26 may perform (block 46) one or more actions based on the one or more states of the one or more pipelines 12. Additionally, after performing finite element analysis and the processor 26 predicting that the flow of product in any portion of the pipeline 12 may fall below the threshold boundary, the processor 26 may also perform (block 46) the one or more actions based on the one or more states of the one or more pipelines 12. The assessment may change when conditions of the pipelines change to enable detailed analysis, and may be recalculated using the cloud-based computing system 14.

The actions may include displaying an alert on the graphic user interface (GUI) of an application installed on the computing device 30. The alert may highlight a portion of the pipeline 12 where the violation of the threshold boundary is predicted or detected, or may include a graphic (e.g., a flashing exclamation mark) that is overlaid on the portion of the pipeline 12 where the violation of the threshold boundary is predicted or detected. The alert may provide details as to the issues related to the portion of the pipelines 12 and a timeframe for when any undesirable condition (e.g., cracking or bending of the pipelines 12 that causes the reduced flow) may occur. Additionally, the actions may include scheduling maintenance, repair, and/or replacement of portions of the pipelines 12. In some embodiments, the scheduling may be performed via the GUI of the application executing on the computing device 30. Further, in some embodiments, the actions may include stopping the flow of product in the pipelines 12 when the current state or predicted state indicates a sufficiently severe condition.

Figure 3:
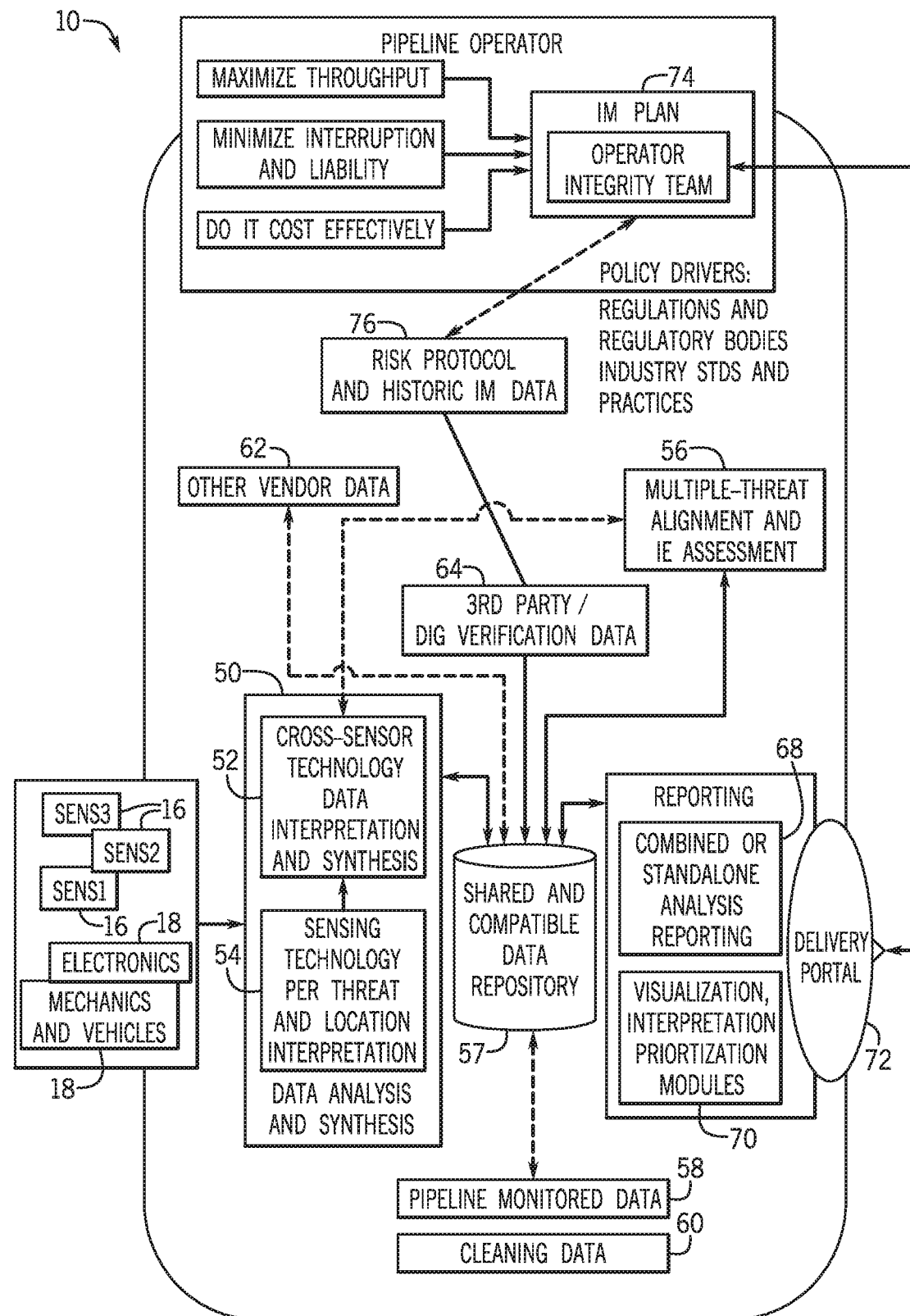
FIG. 3 is an illustration of a block diagram of various components of the system of FIG. 1, in accordance with an embodiment of the present disclosure.

FIG. 3 is an illustration of a block diagram of various components of the system 10 of FIG. 1, in accordance with an embodiment of the present disclosure. As depicted, various ILI tools 18 may include electronics and/or mechanics and vehicles that are used to obtain ILI data. For example, a probe may be attached to a wire that is dispensed through the pipeline networks to obtain ultrasonic and/or electromagnetic data indicative of properties of the pipelines 12. Also, various sensors 16 (e.g., pressure, flow, vibration, thermal, etc.) may be used as part of the ILI tool 18 or as individual externally configured sensors on the pipelines 12. The data may be sent to the cloud-based computing system 14 that performs data analysis and synthesis (block 50). Data analysis and synthesis may include performing multiple sensor 16 technology data interpretation and synthesis (block 52), which uses ILI 18 technology per threat interpretation (block 54).

During block 52, the processor 26 may also perform (block 56) multiple-threat alignment and IE assessment. That is, the processor 26 may correlate the various issues, such as corrosion, cracking, strain loading, and the like, at the element level for each section of the pipelines 12 to build the virtual structural model used for determining the states of the pipelines 12. The processor 26 may perform finite element analysis to predict whether the pipeline 12 future state violates a threshold operating boundary or range. The multiple-threat alignment and assessment may enable and streamline systematic combinational threat assessment in a highly detailed way using element level data in a finite element model. The sensor data and/or the state data (e.g., historic, current, and/or future) may be stored in the shared and compatible data repository (e.g., databases 24). The data that is stored in the databases 24 may be monitored (block 58) to enable taking one or more actions when a desired operating threshold range or boundary is violated. In some embodiments, the processor 26 may periodically clean (block 60) the data by purging certain records.

The database 24 may maintain data for an extended period of time (e.g., decades) to enable visualizing the entire virtual history of the pipe by overlapping the states on a virtual structural model representation of the pipelines 12. The historical visualization may illustrate the historical states of the pipeline 12 to show the transformation of the pipeline 12 over time. The database 24 may also store other vendor data (block 62) and/or third party/dig verification data (block 64).

The processor 26 may perform reporting (block 66) by outputting the results of the predictive integrity virtual analysis that used the virtual structural model to determine states to an application installed on the computing device 30 or a website hosted by one of the servers 20. The processor 26 may perform combined or standalone analysis reporting (block 68). Combined analysis reporting may refer to integrity virtual analysis that combines and correlates the various threats (e.g., corrosion, cracking, and stress loading) in the virtual structural model to make predictions using finite element analysis, or the like. Combined analysis reporting may enable providing each threat related to a particular joint of the pipelines 12. Standalone analysis reporting may refer to just analyzing the integrity of the pipelines 12 based on a single threat (e.g., corrosion) selected by an operator. Visualization and interpretation prioritization modules (block 70) may be used by the processor 26 to enhance interfacing and interaction with the data for the operators. That is, the modules may draw the virtual structural model of the pipelines 12, the alerts on the virtual structural model, arrange various information on the GUI, and the like for example, for easy viewing by the operator.

The processor 26 may deliver (block 72) the results to various personnel in an organization. For example, the results may be delivered to a sales team, a project manager with oversight of the pipelines 12, technical or project managers as stakeholders of the results and/or a pipeline operator's engineering team. Each of the personnel may have installed the application on their computing device 30 or have secure access to the website. That is, role-based security may be enabled where just personnel with proper role and credentials are allowed to see the results of the predictive integrity virtual analysis. In some embodiments, the application that is used on the computing device 30 may be downloaded from a software distribution platform, such as an application store, that authorizes the personnel prior to downloading the application. In some embodiments, the personnel provide their credentials at a login screen, and the website authenticates the user prior to providing access to the results.

An integrity management (IM) plan (block 74) for the pipelines 12 may be generated based on the results of the predictive integrity analysis. The IM plan may consider maximizing throughput of product in the pipelines 12, minimizing interruption to operation, and performing these objectives cost effectively. The IM plan may provide instructions to the operator to perform maintenance on certain portions of the pipelines 12 according to certain timing based on the results from the predictive integrity virtual analysis. For example, the virtual structural model of the pipeline 12 may enable the operator to visualize that a portion of the pipe includes an abnormal radius and general metal loss (e.g., wall thinning), which affects the product carrying capacity of the pipeline 12 under full operating conditions. Based on the correlated threat information, the IM plan may include replacing that portion of the pipeline 12 when product delivery is expected to be reduced to minimize an overall interruption of pipeline operation. In addition, a risk protocol and historic IM data (block 76) may include a procedure to deal with pipeline condition that is included in the threat assessment.

Figure 4:
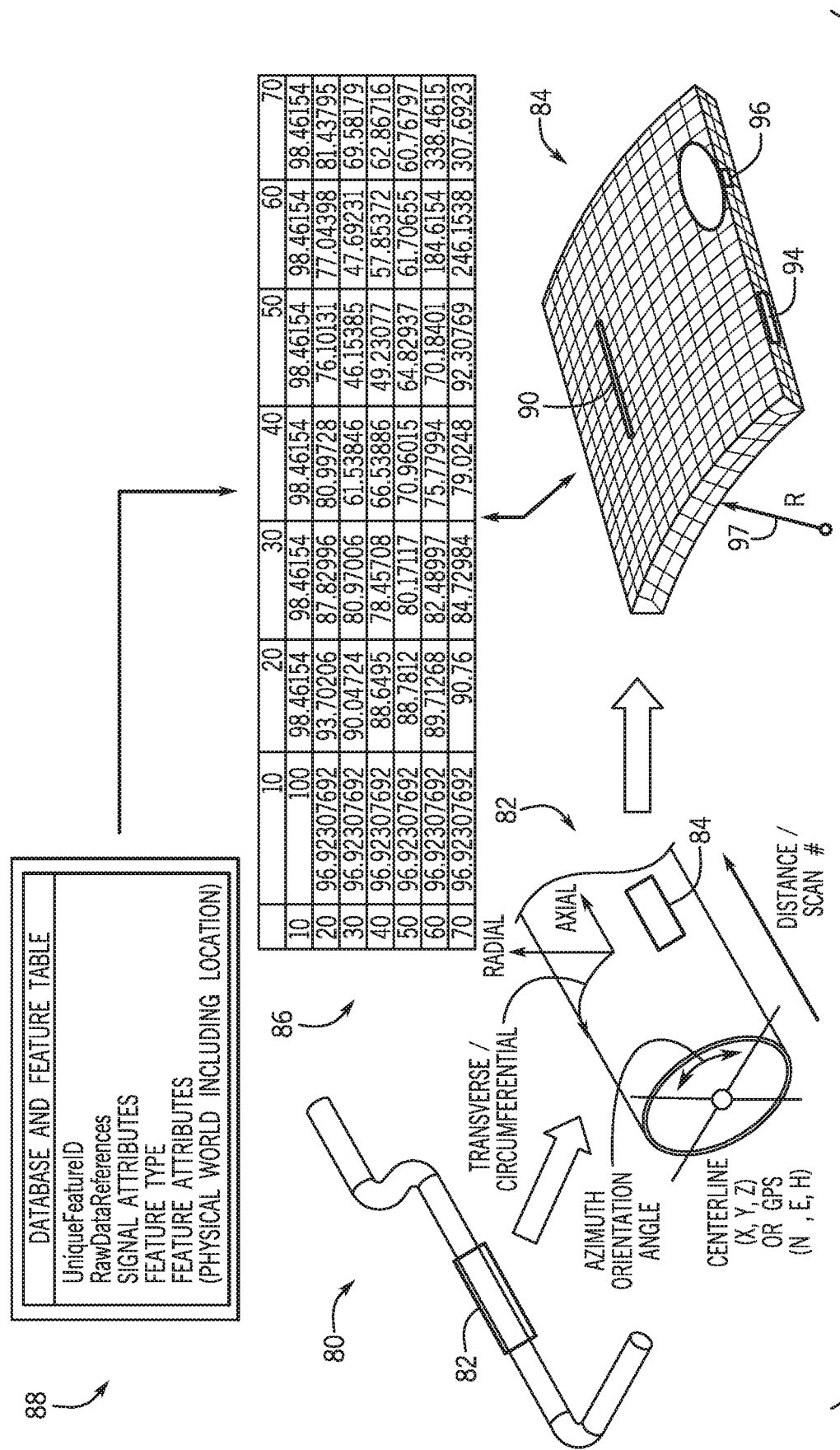
FIG. 4 is an illustration of a visualization of a portion of a pipeline at an element level, in accordance with an embodiment of the present disclosure.

An illustration of a visualization of a virtual structural model 80 of a pipeline 12 is depicted in FIG. 4, in accordance with an embodiment of the present disclosure. The virtual structural model 80 may be generated by the processors 26 of the various servers 20 in the cloud-based computing system 14. As depicted, the virtual structural model 80 depicts a representation of the actual structure of the pipeline 12. The operator may select a portion 82 of the virtual structural model 80 to receive more information of that portion 82 at a zoomed-in view. As depicted, the portion 82 in the zoomed-in view may provide the operator with various information, such as centerline (X, Y, Z), or GPS coordinates (N, E, H), azimuth orientation angle of the pipeline 12, transverse/circumferential, radial, and axial angles, among others. The centerline may be local earth frame reference. The pipeline 12 radius may be given by caliper (e.g., dent deflection as function of azimuth, etc.).

The operator may drill down further into a more granular portion 84 of the pipeline 12 to see information visualized using finite element analysis at the element level. The granular portion 84 at the element level provides a three-dimensional (3D) spatial grid representation of the data provided in a spreadsheet 86 that is based on the data 88 formatted in the databases 24 and/or the memories 22. The granular portion 84 may provide an actual physical representation of the various threats indicated by the data. That is, the granular portion 84 can reconstruct the threats and the physical structure of the pipelines 12 using the data that is formatted for finite element analysis (FEA) or computer-aided design (CAD). In some embodiments, the FEA and/or CAD formatted data may include material properties assigned.

As may be appreciated, the 3D spatial grid representations may be used to enable visually representing cracks 90 (discontinuity between elements). For example, the cracks may have a length and depth but no width and the crack may be localized by distance and azimuth. The 3D spatial grid representation may also visualize welds and other features that can be represented accordingly with geometric and noted material changes. Also, the 3D spatial grid representation may visualize abnormal radius (e.g., within dent/deformation is function of distance azimuth). Also, the 3D spatial grid representation may represent mid-wall features 94, as well as metal loss 96 where the elements are not comprised of steel but of air (in 3D). The pipeline 12 will contain physical fittings such as branches (e.g., off takes of line to other pipelines), stopples, taps and operational equipment such as valves, pumps, compressors, tanks which may be included in the virtual model to varying levels of precise representation in a virtual model according to the information from the data sources and basic user choice. Default representations of the main pipeline, fittings and equipment could be preselected from a preset library of representations for that type of item for use in any virtual model analyses.

Technical effects include providing systems and methods for predictive integrity virtual analysis of pipelines 12 to enhance life of the pipelines 12, reduce costs of servicing and repair, and so forth. The techniques disclosed herein may remove and/or reduce manual handling of data, correlation, and assessment. The techniques may use industry engineering codes and/or computational methods, such as FEA, to establish structural integrity predictions in a very thorough (full pipeline) and timely manner (using high performance computing provided by the cloud-based computing system 14). Combined threats may be considered by the nature of the virtual structural model generated. For example, the virtual structural model may illustrate that bending strain area overlaps with a corrosion area and/or crack anomalies are present in the same area. Further, dented and/or deformed regions with corrosion or cracks may be modeled for fatigue via FEA. Future state predictions may be enabled with the use of baseline current states and addition of change/growth models to each point of the virtual pipeline for each degrading mechanism (e.g., crack growth, corrosion growth, dent fatigue, geotechnical movement). Further, visualization of the entire history of the states of the pipelines 12 may be enabled by overlapping the states in the virtual structural model.

This written description uses examples to disclose embodiments, including the best mode, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Other embodiments are within the scope and spirit of the disclosed subject matter.

In an effort to provide a concise description of these embodiments, all features of an actual implementation may not be described in the specification. In the development of any such actual implementation, as in any engineering or design project, numerous implementation-specific decisions must be made to achieve the developers' specific goals, such as compliance with system-related and business-related constraints or preferences, which may vary from one implementation to another. Moreover, it should be appreciated that such a development effort might be complex and time consuming, but could nevertheless be a routine undertaking of design, fabrication, and manufacture for those of ordinary skill having the benefit of this disclosure.

When introducing elements of various embodiments, the articles "a," "an," "the," and "said" are intended to mean that there are one or more of the elements. The terms "comprising," "including," and "having" are intended to be inclusive and mean that there may be additional elements other than the listed elements.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The invention claimed is:

1. A system, comprising:
   a sensor configured to obtain first inspection data related to a condition of one or more pipelines;
   an inline inspection tool configured to obtain second inspection data related to the condition of the one or more pipelines;
   a computing system remote from the sensor and the inline inspection tool, the computing system communicatively coupled to the sensor and to the inline inspection tool, the computing system comprising at least one data processor configured to execute computer-readable instructions stored in a memory of the computing system, which when executed cause the data processor to:
      receive the first inspection data from the sensor and the second inspection data from the inline inspection tool;
      determine a virtual structural model of the one or more pipelines based on the first inspection data and the second inspection data, the virtual structural model including a visualization of the one or more pipelines, the visualization including a three-dimensional spatial grid representation of the first inspection data and the second inspection data;
      determine one or more structural conditions of the one or more pipelines using the virtual structural model;
      determine one or more actions based on at least one structural condition of the one or more structural conditions exceeding a threshold operation boundary for at least one structural condition of the of the one or more pipelines; and
      provide the one or more actions; and
   a computing device configured to receive the visualization of the one or more pipelines from the computing system and to provide the visualization and the one or more actions within a graphical user interface provided in a display of the computing device, the graphical user interface configured to receive a user selection of a portion of the one or more pipelines and provide the three-dimensional spatial grid representation of the first inspection data and the second inspection data corresponding to the portion of one or more pipelines responsive to the user selection, wherein the three-dimensional spatial grid representation corresponding to the portion of the one or more pipelines includes graphical indications of physical characteristics associated with one or more structural conditions present at the user-selected portion of the one or more pipelines.

2. The system of claim 1, wherein the at least one data processor is configured to determine the at least one structural condition based on performing a finite element analysis of the first inspection data and the second inspection data.

3. The system of claim 1, wherein the one or more structural conditions are associated with physical characteristics of the one or more pipelines, the physical characteristics including a corrosion event, a volumetric wall loss, an orientation, a dimension, a geometry, a material structural property, a crack, a pressure, a flow, a weld anomaly, a bend, a bending strain, a load strain, a fitting associated or any combination thereof.

4. The system of claim 1, wherein the sensor includes a magnetic, radiographic, or electromagnetic sensor.

5. The system of claim 4, wherein the computing device is configured to provide an alert when the at least one structural condition exceeds the threshold operation boundary within the graphical user interface.

6. The system of claim 5, wherein the computing device is configured to provide a signal to the computing system to halt a flow of a product in the one or more pipelines based upon the alert.

7. The system of claim 5, wherein the computing device is configured to schedule maintenance, repair, and/or replacement of the portion of the one or more pipelines based on the alert.

8. The system of claim 1, wherein the graphical user interface is configured to display a pipeline centerline in geometric or global positioning system coordinates, or an azimuth orientation angle associated with the user-selected portion of the one or more pipelines.

9. The system of claim 1, wherein the inline inspection tool is configured to provide the second inspection data as navigational data and the data processor determines a continuous pipeline centerline in global positioning system coordinates based on the navigational data.

10. A device, comprising:

a memory storing a first inspection data received from a sensor coupled to the device, the first inspection data corresponding to a structural condition of a pipeline, and a second inspection data received from an inline inspection tool coupled to the device, the second inspection data corresponding to the structural condition of the pipeline, the memory further storing computer-readable instructions; and a data processor coupled to the memory and configured to execute the instructions, which when executed cause the data processor to:

receive the first inspection data and the second inspection data from the memory;

determine a virtual structural model of the pipeline based on the first inspection data and the second inspection data, the virtual structural model including a visualization of the pipeline, the visualization including a three-dimensional spatial grid representation of the first inspection data and the second inspection data;

determine one or more structural conditions of the pipeline using the virtual structural model;

determine one or more actions based on the one or more structural conditions exceeding a threshold operation boundary of the pipeline; and provide the visualization of the pipeline and the one or more actions to a remote device coupled to the device, the remote device configured to receive the visualization of the pipeline and to provide the visualization and the one or more actions within a graphical user interface provided in a display of the remote device, the graphical user interface configured to receive a user selection ofa portion of the pipeline and provide the three-dimensional grid spatial representation of the first inspection data and the second inspection data corresponding to the portion of the pipeline responsive to the user selection, wherein the three-dimensional spatial grid representation includes graphical indications of physical characteristics associated with one or more structural conditions present at the user-selected portion of the one or more pipelines.

11. The device of claim 10, wherein the data processor is configured to determine the one or more structural conditions based on performing a finite element analysis of the first inspection data and the second inspection data.

12. The device of claim 10, wherein the one or more structural conditions are associated with physical characteristics of the one or more pipelines, the physical characteristics including a corrosion event, a volumetric wall loss, an orientation, a dimension, a geometry, a material structural property, a crack, a pressure, a flow, a weld anomaly, a bend, a bending strain, a load strain, a fitting, or any combination thereof.

13. The device of claim 10, wherein the sensor includes a magnetic, a radiographic, an ultrasonic, or an electromagnetic sensor.

14. The device of claim 10, wherein the graphical user interface is configured to display a pipeline centerline in geometric or global positioning system coordinates, or an azimuth orientation angle associated with the user-selected portion of the one or more pipeline.

15. The device of claim 10, wherein the inline inspection tool is configured to provide the second inspection data as navigational data and the data processor determines a continuous pipeline centerline in global positioning system coordinates based on the navigational data.

16. The device of claim 10, wherein the first inspection data and the second inspection data include magnetic, ultrasonic, radiographic, and/or electromagnetic inspection data.

17. The device of claim 10, wherein the data processor is configured to generate a prediction of an operation of the pipeline based on the virtual structural model.

18. The device of claim 17, wherein the data processor is configured to transmit the prediction of the operation of the pipeline in conjunction with information indicative of the one or more structural conditions.

19. A non-transitory tangible computer-readable medium comprising computer executable instructions configured to:

receive, by a data processor, first inspection data obtained from a sensor coupled to the data processor, the first inspection data related to a condition of a pipeline;

receive, by the data processor, second inspection data obtained from an inline inspection tool coupled to the data processor, the second inspection data related to the condition of the pipeline;

determine a virtual structural model of the pipeline based on the first inspection data and the second inspection data, the virtual structural model including a visualization of the pipeline, the visualization including a three-dimensional spatial grid representation of the first inspection data and the second inspection data;

determine one or more structural conditions of the pipeline using the virtual structural model;

determine one or more actions based on the one or more structural conditions exceeding a threshold operation boundary of the one or more structural conditions of the pipeline; and provide the visualization of the pipeline and the one or more actions to a remote device coupled to the device, the remote device configured to receive the visualization of the pipeline and to provide the visualization and the one or more actions within a graphical user interface provided in a display of the remote device, the graphical user interface configured to receive a user selection of a portion of the pipeline and provide the three-dimensional spatial grid representation of the first inspection data and the second inspection data corresponding to the portion of the pipeline responsive to the user selection, wherein the three-dimensional spatial grid representation includes graphical indications of physical characteristics associated with one or more structural conditions present at the user-selected portion of the one or more pipelines.

20. The non-transitory computer-readable medium of claim 19, further comprising instructions configured to cause the data processor to determine a plan to allow for a threshold throughput amount to be transmitted through the pipeline or to reduce interruption of an operation of the pipeline.

* * * * *